Figure 3:
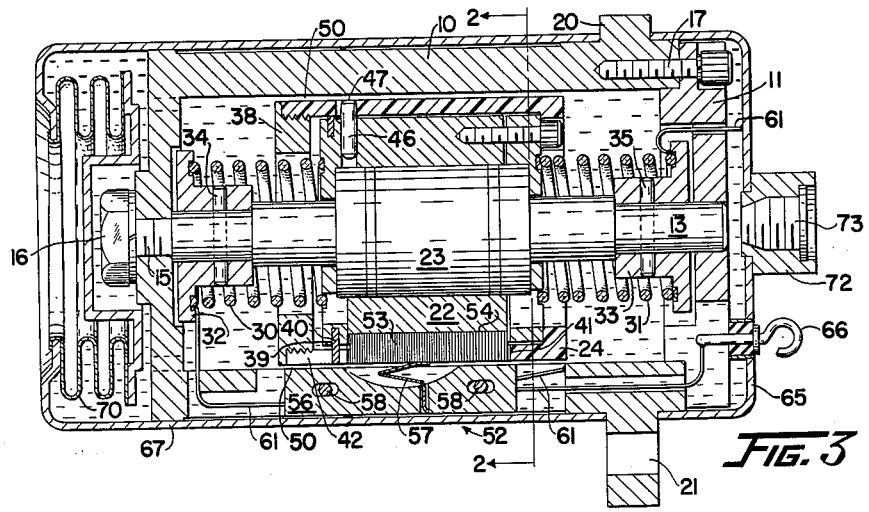

Sept. 24, 1963  J. R. BOUCHARD  3,104,552
CONTROL APPARATUS
Filed April 24, 1957

INVENTOR.
JOHN R. BOUCHARD
BY Joseph E. Ryan
ATTORNEY

3,104,552
CONTROL APPARATUS
John R. Bouchard, Norwood, Mass., assignor to Minneapolis-Honeywell Regulator Company, Minneapolis, Minn., a corporation of Delaware
Filed Apr. 24, 1957, Ser. No. 654,745
1 Claim. (Cl. 73—497)

My invention relates to control apparatus and more particularly to an improved accelerometer design which utilizes a novel damping arrangement and an improved method of temperature compensation for the same.

Control apparatus, and in particular accelerometers, have utilized fluid type damping for some time to increase the stability and accuracy in the operation of such equipment. Most damping means or arrangements for control devices and accelerometers, where they are built into the device or accelerometer are of the linear shear type. In general, linear shear type damping is employed in control apparatus where rotary movement between the parts of the apparatus is obtained. While all fluid damping is basically shear damping, flow type damping is differentiated from linear shear damping in that the velocity distribution of the damping fluid is not linear. In control apparatus and accelerometers where axial displacement of the parts of the control apparatus is present, the use of linear shear type damping adds to the complexity of the apparatus and in general is deficient in accuracy because of the dimensional tolerances required. Where flow type damping is incorporated into axial displacement devices, it is generally done with dampers remote from the control apparatus such as dash pots and the resultant apparatus is generally quite bulky in size and complex in design.

The present invention is directed to improved control apparatus or accelerometer utilizing flow type damping in which one of the components of the control apparatus is utilized to define a damping gap or path through which the damping fluid flows to make for simplicity in design. A further problem in the use of damping control apparatus is the effect of ambient temperature change on the damping characteristics due to change in viscosity of the damping fluid and changes in the dimensions of the parts of the control apparatus. Various arrangements have been utilized to maintain a constant ambient temperature at the expense of additional equipment and complexity in the control apparatus and in some instances arrangements have been utilized to compensate for the change in viscosity of the damping fluid due to the ambient temperature change. In my invention, the flow type damping incorporates a temperature compensator which maintains a substantially constant damping of the control apparatus with ambient temperature change through a simplified arrangement of parts and which at the same time is extremely accurate and economical to manufacture.

It is therefore an object of this invention to provide an improved accelerometer design.

It is further an object of this invention to provide in an improved accelerometer a flow type damping arrangement which is simple in design and does not add to the overall dimensions or size of the control apparatus.

A further object of this invention is to provide in an improved accelerometer design a flow type damping using a variable damping gap or path including a temperature compensator which maintains a uniformity in the dimension of the gap to add to the accuracy of the apparatus.

A still further object of this invention is to provide an improved arrangement of parts for maintaining a uniform gap in a flow type damper applied to a control apparatus.

Figure 1:
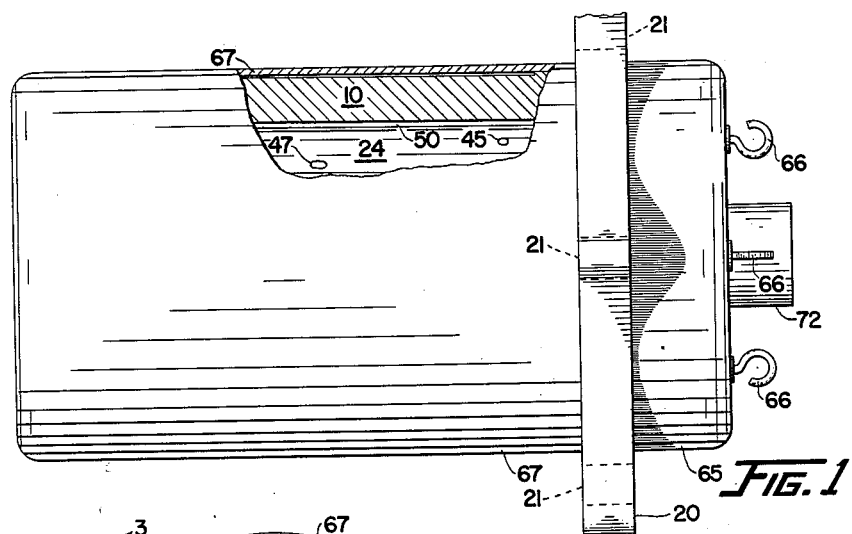
Figure 2:
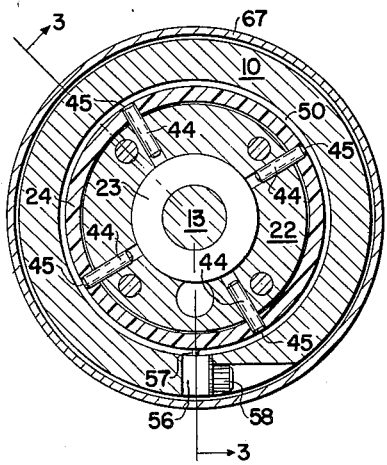

These and other objects of this invention will become apparent from a reading of the attached description together with the drawing wherein:

FIGURE 1 is a side elevation view of an improved accelerometer with parts broken away, FIGURE 2 is a sectional view of the accelerometer shown in FIGURE 1 taken along the lines 2—2 of FIG. 3, and FIGURE 3 is a side view in section of the accelerometer shown in FIGURE 1 taken along the lines 3—3 as shown in FIGURE 2.

My improved control apparatus or accelerometer is shown herein as a linear accelerometer similar to the type disclosed in the patent of C. R. Bonnell No. 2,752,466 dated June 26, 1956. As will be seen in the drawings, this improved accelerometer includes a two part housing member including a cup-shaped cylindrical member 10 and an end plate 11 in which is positioned a centrally located shaft 13 secured at its extremities to the end plate and the closed end of the cup-shaped cylindrical member 10. The shaft is threaded at 15 and secured to the member 10 by a suitable nut and lock washer means 16 and is adapted to be centered and press fitted into the end plate 11 which end plate is secured to the cylindrical member 10 through suitable screw means 17. The cylindrical member 10 also includes a flange section 20 having apertures 21 therein which as will be seen in FIGURES 1 and 3 provide for mounting of the control apparatus or accelerometer on devices or apparatus with which this accelerometer is to be associated.

Positioned on the shaft 13 is a mass for the accelerometer which includes a cylindrical support member 22 mounted on a bearing means 23 of the type shown in the above identified Bonnell patent with a temperature compensator 24 mounted on the support 22, the details of the compensator to be later defined. The movable portion of the bearing assembly together with the support member and compensator form the journalled mass for the accelerometer which moves relative to the shaft and on the shaft in an axial direction along the extent of the shaft and which is substantially prohibited against any radial movement due to the nature of the bearing assembly 23, the details of which are not shown herein inasmuch as they are well known and form no part of the subject invention. This mass for the accelerometer is biased or positioned on the shaft in a predetermined neutral position through a pair of springs 30, 31 which encircle the shaft at the extremities to either side of the bearing and support member. One extremity of each spring rests in a spring retaining groove in the support member, the other extremity is mounted on a spring retainer 32, 33, respectively positioned on the shaft and suitably secured thereto such as through keys 34, 35, respectively. Thus the mass on the shaft will be affected by the accelerations imparted to the housing to displace the same along the shaft through the bearing means against the bias of the respective springs to provide a resultant movement which is proportional to or indicative of the lateral accelerations sensed by the accelerometer.

The temperature compensator or sleeve 24 is made of a thermo-plastic material such as nylon having a high thermal coefficient of expansion compared to the metals used in the remaining parts of the accelerometer. The compensator is fitted over the support member 22 and has an end plate 38 at one extremity which is threaded and tapped into one extremity of the nylon sleeve while the other extremity is slightly flanged to retain the same over the support member 22. A ring 40 fitted into a slot 39 in support 22 and a wide notch 42 in sleeve 24 permits free movement of the sleeve in a radial and axial direction and acts as a stop to prevent fluid flow between the sleeve and the support as the sleeve expands radially.

Also included in the nylon sleeve is a slot 41 through which is positioned a controller to be later identified. It will be seen in FIGURES 2 and 3, the support member 22 has a pluraltiy of pins 44, 46 positioned near the extremities thereof and suitably secured thereto such as by pressfitting which pins cooperate with a plurality of apertures 45, 47 in the nylon sleeve to provide a guide means for the expansion and contraction of the nylon sleeve. As will be seen in the drawings, the pins 44 and holes or slots 45 are located near one extremity of the sleeve and support with the pins and holes being so dimensioned as to allow for radial movement of the sleeve and substantially prohibiting axial movement of the sleeve at this point. The pins and slots 46, 47 near the other extremity of the support and sleeve, as will be seen in FIGURES 1 and 3, permit axial expansion, in addition to radial expansion, of the sleeve relative to the support since the slots are substantially elliptical in form. This guiding arrangement through a loose fit of the pins in this sleeve 24 allows for uniform radial expansion of the temperature compensator with changes in ambient temperature within and surrounding the accelerometer to vary the dimensions of an annular damping gap or path defined by the outer peripheral surface of the nylon sleeve and the smooth inner surface indicated at 50 of the housing member 10. It would be evident, however, that the relationship of the pins and apertures could be reversed and the pin members could be secured to the nylon sleeve, the guiding apertures being located in the support member. It should further be recognized that other types of radial guiding means can be used herein which will provide for uniform radial expansion of the sleeve type compensator, for example, the pins could be positioned axially in the support to cooperate with guiding radial slots in the radially extending flanges of the compensator parts 38 and 22. Positioned within the housing and surrounding the mass formed of the support members 22, sleeve 24 and bearing assembly as well as the shaft 13 is a damping fluid having a predetermined viscosity which is designed to damp the axial movement of the mass on the shaft. The support member 22 and sleeve 24 form a piston and the damping fluid upon displacement of this mass on the shaft will flow through the predetermined damping path or gap to provide a fixed damping for the accelerometer. With variations in ambient temperature, the viscosity of the damping fluid will be varied and the resultant variation in the damping gap 50 due to expansion and contraction of the temperature compensator will compensate for this effect of the change in viscosity of the damping fluid to provide a substantially constant damping ratio for the accelerometer with varying ambient temperature. By utilizing a flow type damping as distinguished from a linear shear type damping and defining a damping gap or path through which the damping fluid flows by the mass itself and the wall of the supporting container, a simplified damping arrangement which is extremely accurate and simple to compensate and control.

Also included in the accelerometer is a potentiometer type signalling device formed of a wiper assembly 52 and a winding 53 which are shown herein as being mounted on the housing and mass respectively. The winding 53 is mounted on a bobbin and fits through the slot 41 in the nylon sleeve 24 and into a slot 54 in the support member 22 where it is suitably secured through means (not shown) such as cementing. Positioned in a slot in the housing 10 is a wiper assembly block 56 having a wiper blade 57 extending therethrough and aligned with the winding such as to engage the same in a conventional manner. Screw means 58 secures the wiper assembly to the housing 10 as will be seen in FIGURE 2.

Electrical connections are made to the potentiometer assembly through in leads indicated at 61 which are connected through conductors to the extremities of the springs 30, 31 and to the extremities of the windings (not shown). The wiper assembly for wiper blade 57 is also connected through a conductor (not shown) to a terminal means extending through the end wall 11 of the housing. Surrounding the end wall of the housing is a casing part or member 65 having a plurality of connector members 66 therein which connect to the in leads 61 and the in leads for the wiper assembly (not shown). This casing member is adapted to be secured to the flange portion 20 of the housing member 10 through suitable means such as soldering. A similar casing member covers the other extremity of the housing, the casing part being identified as 67 which is also secured to the flange portion 20 of the housing member 10 through suitable means such as soldering. Positioned beyond the closed surface of the housing member 10 and within the casing part 67 is a bellows assembly 70 which seals this extremity of the casing member and is suitably secured thereto by means not shown which bellows assembly is sealed and allows the damping fluid to pass through to this portion of the casing as a reservoir with the bellows being variable in volume and displaceable to allow for expansion and contraction of the damping fluid in a conventional manner. The casing part 65 also includes a passage or vent member 72 having a closing plug 73 therein allowing for communication to the inside of the sealed accelerometer for the purpose of filling the same with a damping fluid and sealing the same.

In operation, this control device or accelerometer operates for the most part in a conventional manner. Displacement of the mass in response to accelerations imparted to the control device operates the potentiometer assembly to provide a signal indicative of the magnitude of the linear accelerations imparted thereto. The damping fluid within the casing flows from one end of the housing to the other through the gap or damping path defined by the temperature compensator and the inner surface of the cylindrical housing at a controlled rate depending upon the gap dimensions and the viscosity of the fluid together with the force applied to the piston. This damping is accurate and provides an extremely simple and sensitive control device. Variation of ambient temperature of the apparatus changing the viscosity of the damping fluid is compensated by the simple temperature compensator which varies the gap or path dimensions to control the flow of the damping fluid. In order to ensure that the temperature compensator will expand and contract uniformly to maintain a constant and uniform annular damping path, guide means are provided which permits the temperature compensator to expand uniformly in all directions. The lateral or axial movement of the temperature compensator is ineffective to alter the damping characteristics of the device since this direction of change does not alter the damping path. The compensator or sleeve is mounted on the support at one extremity through the cooperation of pins 44 and slots 45 such that these parts are axially fixed and move together except for axial expansion which is permitted by the cooperation of pins 46 and slots 47.

While I have disclosed my apparatus is connection with an accelerometer, it will be understood that the damping aspect may be applied to other types of control apparatus. Further, although the details of the guide means for the flow type damper are disclosed in connection with flow type damping, it will be recognized that the same principle may be applied to shear type damping. Therefore, I wish to be limited only by my appended claim.

I claim as my invention:

In an accelerometer: a shaft; a hollow housing of relatively low thermal coefficient of expansion, said housing having an inner cylindrical surface and mounting said shaft centrally therein; a cylindrically shaped seismic mass member positioned on said shaft; bearing means mounting said mass member on said shaft for relative axial movement therebetween; biasing means connected between said housing and said mass member to bias said mass member to a predetermined position; damping means for said mass member including a cylindrical sleeve member of relatively high thermal coefficient of expansion positioned over and loosely encircling said mass member, said sleeve cooperating with said inner cylindrical surface of said housing to provide an annular damping gap therebetween, and said damping means including a damping fluid disposed in said housing and filling said gap; and guide means for providing unrestrained axial and radial expansion and contraction of said sleeve member relative to said mass member and to said housing in response to temperature changes so as to maintain concentricity of said sleeve member relative to said shaft and to said housing and so as to provide a uniformity in variation of said damping gap, said guide means comprising a first and second set of apertures in one of said members, said set of apertures being axially spaced from one another, and a plurality of pins mounted on the other of said members and radially projecting into said sets of apertures.

References Cited in the file of this patent

UNITED STATES PATENTS

| | | |
|---|---|---|
| 1,074,961 | Leonard | Oct. 7, 1913 |
| 1,407,320 | Bouche | Feb. 21, 1922 |
| 2,332,994 | Draper et al. | Oct. 26, 1943 |
| 2,650,753 | Howard et al. | Sept. 1, 1953 |
| 2,719,612 | Previnquieres | Oct. 4, 1955 |
| 2,748,567 | Dougherty | June 5, 1956 |
| 2,752,466 | Bonnell | June 26, 1956 |
| 2,831,670 | Bourns et al. | Apr. 22, 1958 |
| 2,858,673 | Wirt | Nov. 4, 1958 |
| 2,881,868 | Frykman | Apr. 14, 1959 |

FOREIGN PATENTS

| | | |
|---|---|---|
| 1,121,957 | France | May 14, 1956 |
| 686,705 | Great Britain | Jan. 28, 1953 |